United States Patent [19]
Raychaudhuri

[11] Patent Number: 4,641,304
[45] Date of Patent: Feb. 3, 1987

[54] ANNOUNCED RETRANSMISSION RANDOM ACCESS SYSTEM

[75] Inventor: Dipankar Raychaudhuri, Kendall Park, N.J.

[73] Assignee: RCA Corporation, Princeton, N.J.

[21] Appl. No.: 873,446

[22] Filed: Jun. 6, 1986

Related U.S. Application Data

[63] Continuation of Ser. No. 610,007, May 14, 1984, abandoned.

[51] Int. Cl.⁴ .......................... H04J 3/02; H04J 3/24; H04J 3/16
[52] U.S. Cl. ...................................... 370/95; 370/93; 370/85
[58] Field of Search .................. 370/93, 94, 95, 85, 370/104, 110.1, 89

[56] References Cited

U.S. PATENT DOCUMENTS

| | | | |
|---|---|---|---|
| 4,234,952 | 11/1980 | Gable et al. | 370/85 |
| 4,337,465 | 6/1982 | Spracklen et al. | 370/85 |
| 4,380,761 | 4/1983 | Boggs | 370/85 |
| 4,395,710 | 7/1983 | Einolf, Jr. | |
| 4,408,300 | 10/1983 | Shima | |
| 4,412,326 | 10/1983 | Limb | |
| 4,504,946 | 3/1985 | Raychandhuri | 370/95 |

OTHER PUBLICATIONS

Tobagi, "Multiaccess Protocols in Packet Communication Systems", IEEE Trans, on Comm., vol. COM-28, No. 4, Apr. 1980, pp. 468-488.

Primary Examiner—Douglas W. Olms
Assistant Examiner—Wellington Chin
Attorney, Agent, or Firm—Joseph S. Tripoli; Robert L. Troike; William H. Meise

[57] ABSTRACT

A transmission system employing a satellite and a plurality of ground stations each capable of transmitting and receiving data packets to and from each other via the satellite. The satellite station comprises first logic for dividing absolute time into time frames and time frames into message (time) slots with each message slot having a small percentage thereof divided into mini-slots and with each mini-slot in each message slot corresponding to a particular message slot in a future time frame, and second logic including a random number selector responsive to the selection of message slots in the same current time frame by two or more data packets, and third logic for randomly selecting mini-slot for each message slot in which a data packet is to be transmitted in the current time frame with the selected mini-slot for each message slot in the current time frame defining the particular message slot in the future time frame in which the data packet is to be transmitted in case two stations select the same message slot in the current time frame to cause a conflict. A future frame is a time frame which occurs after the data packet in the current time frame has propagated from its originating ground station to the satellite and then back to the originating ground station.

7 Claims, 8 Drawing Figures

LEGEND $T_f \Rightarrow$ FRAME PERIOD
$T \Rightarrow$ MESSAGE SLOT PERIOD
$\Delta T \Rightarrow$ MINISLOT PERIOD
$K\Delta T \Rightarrow$ TOTAL OF MINISLOT PERIODS
$T_m \Rightarrow T - K\Delta T$
MESS $\Rightarrow$ MESSAGE

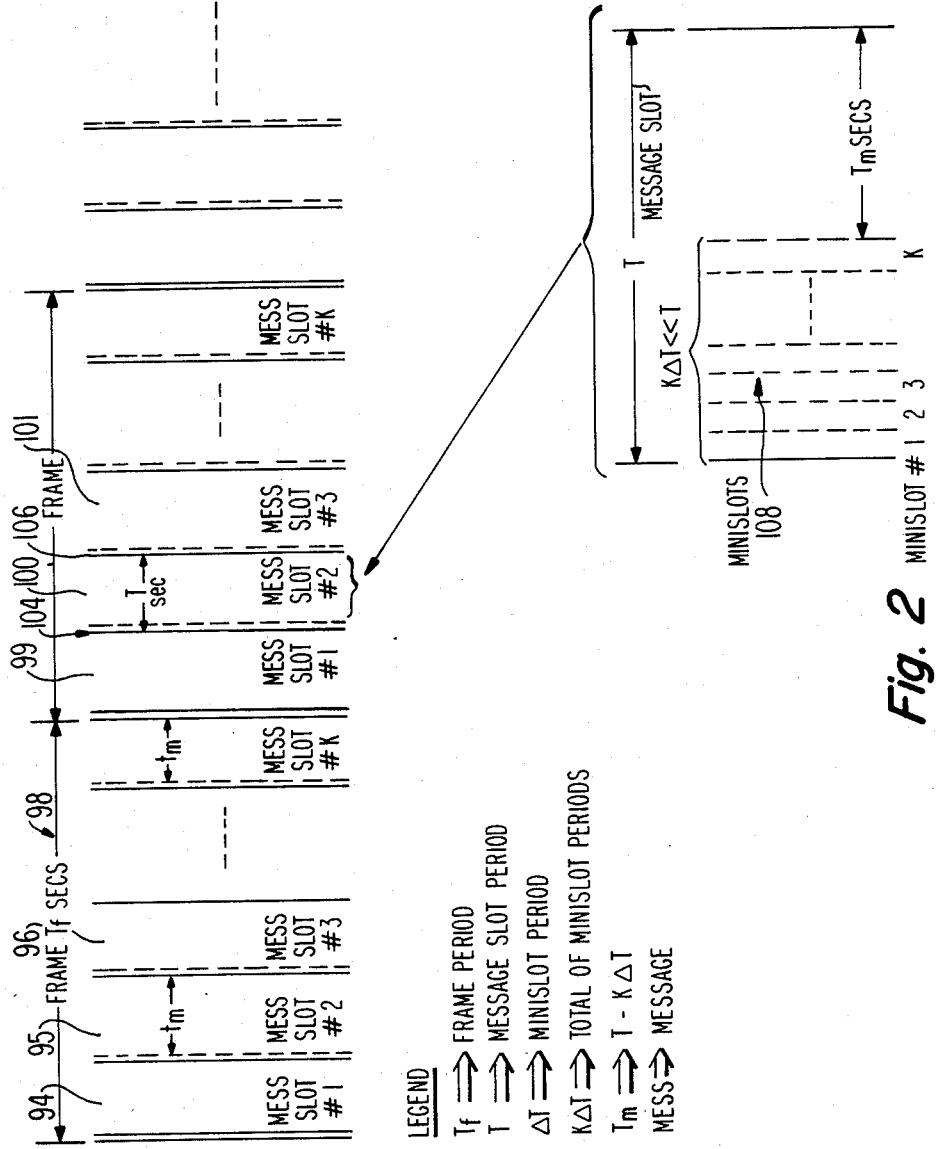

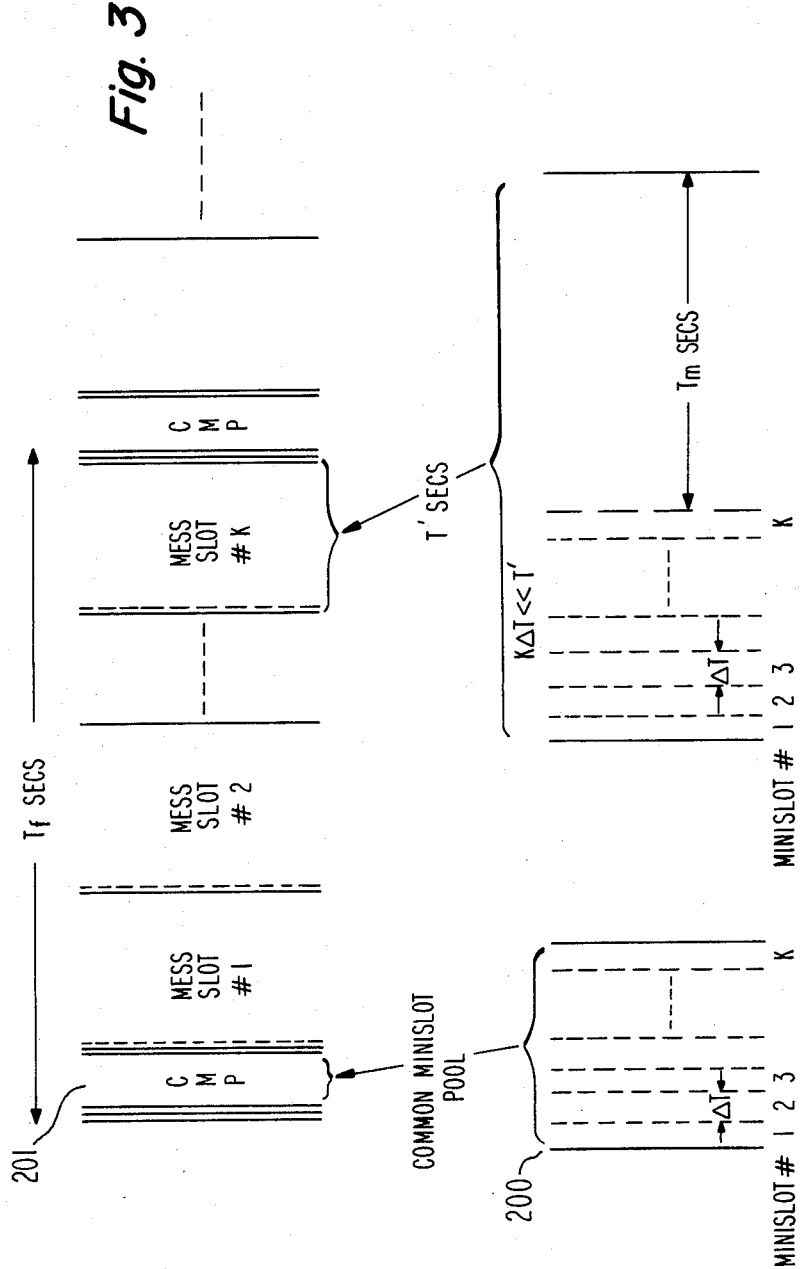

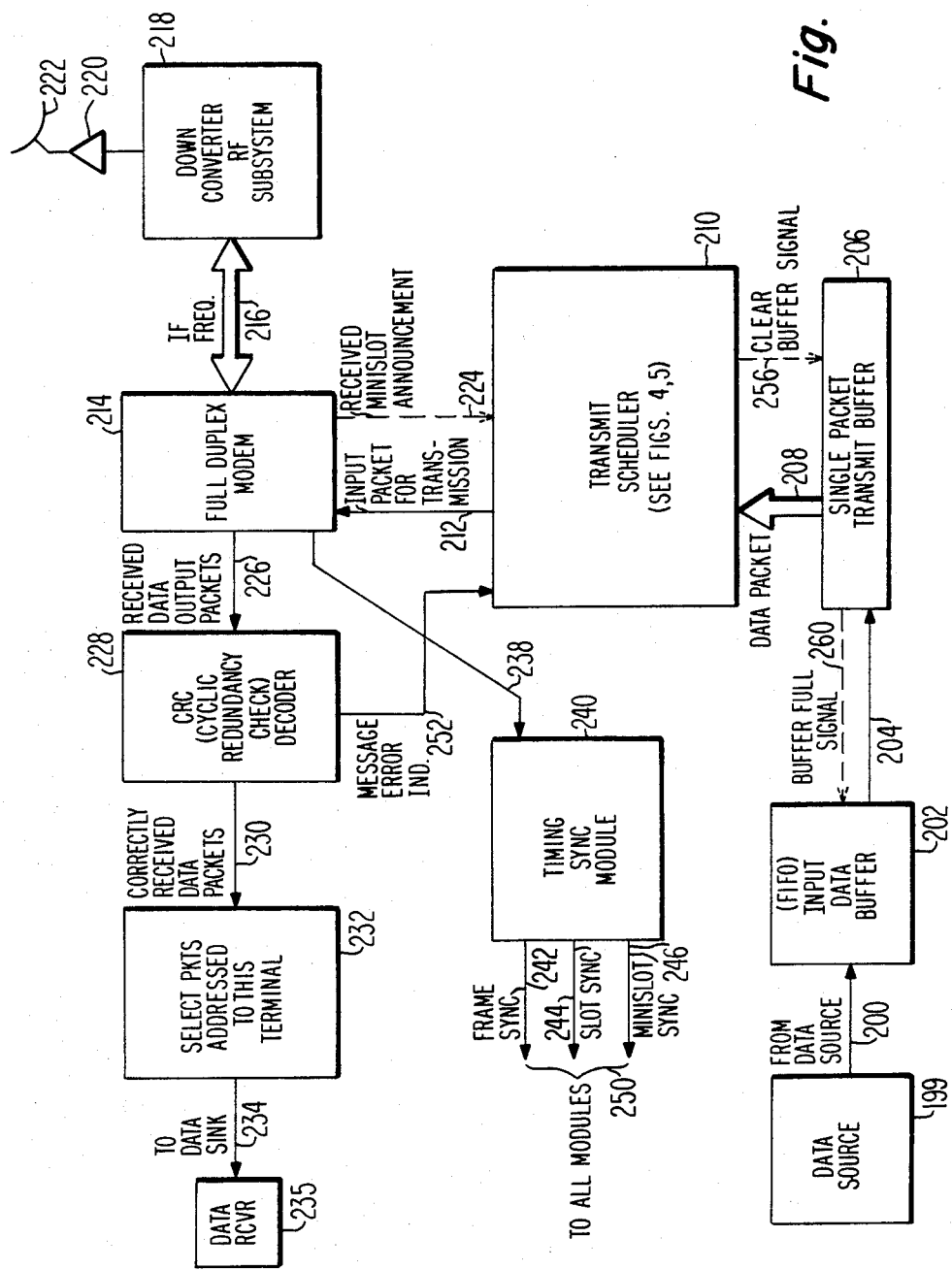

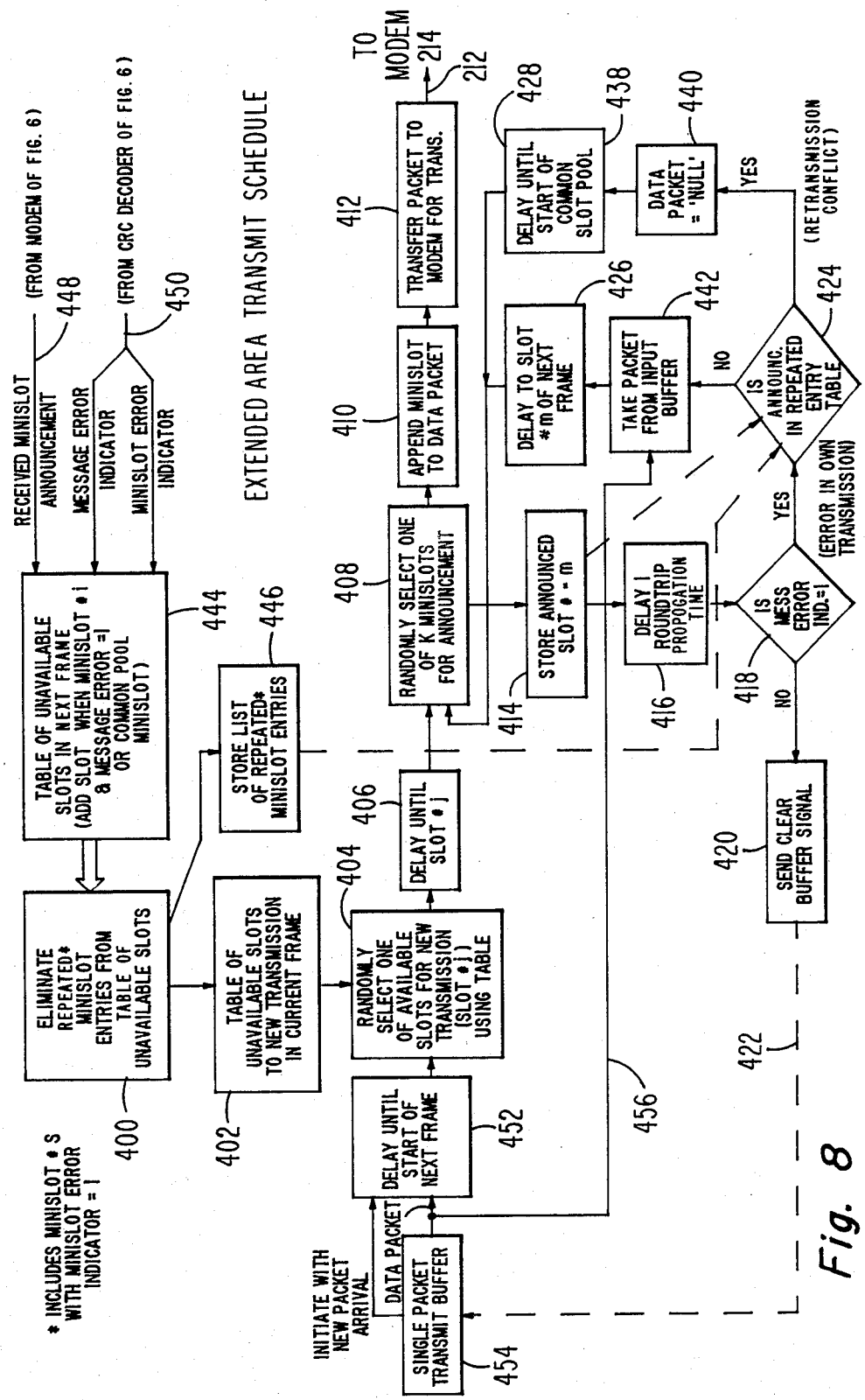

ANNOUNCED RETRANSMISSION RANDOM ACCESS SYSTEM

This is a continuation of application Ser. No. 610,007, filed May 14, 1984, now abandoned.

BACKGROUND OF THE INVENTION

This invention relates generally to a time synchronized random (contention type) access system employing a single wideband channel time shared by a plurality of random access transmit stations in which packets of information are transmitted in time slots selected randomly from one station to another. More particularly, the invention relates to such a system in which the instances of two or more transmitters selecting the same time slots for transmission of a message, resulting in a conflict, is reduced dramatically, thereby increasing the efficiency of the system, that is the useful percentage of available time slots.

In systems of the type being discussed there are a number of ground stations and a master station which can be either a ground station which performs a function of synchronizing the transmission of packets of information, all of which must be retransmitted from the satellite in a time synchronous manner. Similarly, transmissions from the ground stations to the satellites are timed so that they arrive at the satellite in a time synchronous manner.

It is apparent that without some precaution being taken that the number of conflicts or collisions between data packets from two stations arriving in the same time slot is an entirely random matter and occurs at much higher frequency than would be the case where certain precautions are taken, such as the techniques employed in the present invention. Statistically, with no precautions, the utilization of random time slots is approximately 37% without precaution being taken to avoid conflicts or collisions between messages from different transmitters in the same time slots. As will be seen later herein, the efficiency of the usage of the time slots can be raised to 53% and even to 60% by employing certain precautionary techniques which form the basis of the present invention, which has been given the name Announced Retransmission Random Access (ARRA). The basic concept of the present invention is to reduce these wasteful collisions in the random access channel by requiring the station terminals to transmit an announcement with each data packet or message specifying an intended retransmission time slot or message slot along with every transmitted message. Thus in the event of a collision, the other terminal stations in the system will know which slot the particular message which collided with another message will be retransmitted in, and can avoid placing new transmissions in that message time slot.

Basically the ARRA scheme set forth in the present invention completely eliminates collision between new message transmissions and retransmitted messages, thus resulting in a significantly higher throughput than conventional random access systems, such as slotted ALOHA and the Capetenakis Tree algorithm. The ALOHA system is well known art as defined in Abramson, "The ALOHA System—Another Alternative for Computer Communication", AFIPS Conference Proceedings, 1970 Fall Joint Computer Conference, Vol. 37, pp. 281-285. Capetanakis Tree algorithm is defined by J. I. Capetanakis, "Generalized TDMA: The Multi-Accessing Tree Protocol", IEEE, Transactions on Communications, Vol. 27, No. 10, Oct. 1979, pp. 1476-1483.

The two ARRA schemes as described in detailed in the present invention are realized with a relatively small amount of logic and storage at each of the terminals. Two realizations are described. The first realization is called basic ARRA and has a capacity (maximum normalized throughput) of 0.53, which means that approximately 50% of the time slots are successfully utilized. The second scheme is called Extended ARRA and achieves a capacity of 0.6, at the expense of a slightly greater terminal complexity. The main application area for the protocol of systems described herein are in satellite communication systems with many relatively low cost digital terminals (ground stations) sharing a common channel. For completely terrestrial networks with low propagation delay, high throughput random access systems (e.g., such as Xerox's Ethernet) already exist. For the satellite channel (which has a high propagation delay of 0.27 seconds) ARRA provides the highest throughput along with low delay among the comparable random access schemes currently described in the literature.

SUMMARY OF THE INVENTION

In a preferred form of the invention there is provided a transmission system employing a master station such as a satellite and a plurality of ground stations capable of transmitting and receiving data packets to and from each other via said master station. The master station comprises first logic system for dividing absolute time into time frames and time frames into message (time) slots with each message slot having a small percentage of its allotted time interval divided into minislots and with each minislot in each message slot corresponding to a particular message slot in a future time frame and second logic system including random number selection means responsive to the selection of message slots in the same current time frame by two or more data packets, and a third logic system randomly selects a minislot for each message slot in which a data packet is to be transmitted in the current time frame with the selected minislot for each message slot in the current time frame defining the particular message slot in the future time frame in which the data packet is to be transmitted. In case two stations select the same message plot in the current time frame to cause a conflict. A future frame is defined herein as a time frame which occurs after the data packet in the current time frame has propagated from its originating ground station to the satellite and then back to the originating ground station.

DESCRIPTION OF THE DRAWING

In the drawings:

FIG. 1 is a diagram showing the time slot arrangement for the basic ARRA system;

FIG. 2 is an enlarged view of one of the message slots and the group of minislots that accompanies each message slot of FIG. 1, and also shows a blow up of the minislots that accompanies each message slot;

FIG. 3 is a diagram of the message slots contained in a frame of the extended ARRA system and also the group of minislots in the common minislot pool (CMP);

FIG. 4 is an expanded view of one of the message slots of FIG. 3 and also an expanded view of the minislots associated with that particular message slot;

FIG. 5 is an expanded view of the minislots in the common minislot pool of FIG. 3 employed in the extended ARRA. It will be noted that the basic ARRA shown in FIGS. 1 and 2 has no common minislot pool;

FIG. 6 is a general block diagram for implementing channel format for the basic ARRA shown in FIGS. 1 and 2 and also for implementing the extended ARRA channel format shown in FIGS. 3, 4 and 5 with the difference for implementing the basic and extended ARRA formats being primarily in the logic contained in the transmit scheduler 210 of FIG. 6;

FIG. 8 is the schematic diagram for implementing the extended ARRA format with of the transmit schedule for implementing the extended ARRA format shown in FIGS. 3, 4, 5.

DETAILED DESCRIPTION OF THE INVENTION

Figure 7:
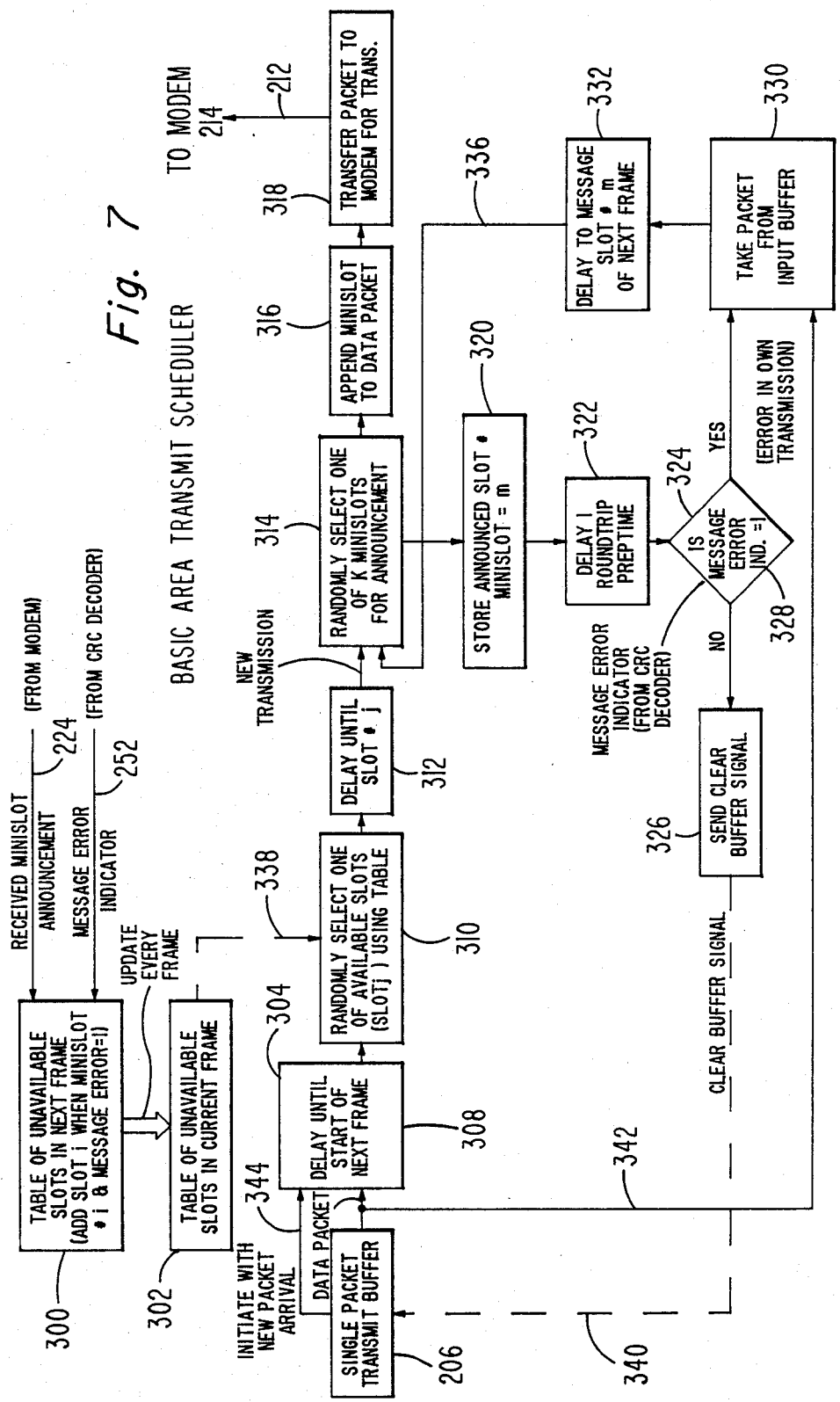
FIG. 7 is a block diagram of a transmit scheduler employed to implement the basic ARRA format shown in FIGS. 1 and 2.

Referring now to FIG. 1 there are shown two frames of the basic ARRA system, 98 and 99, each having a number of message slots, numbered from 1 to K. Each frame is $t_f$ seconds in length and each message slot has a time duration of $t_m$. Two of the message slots in frame 99 are identified as message slots 100 and 101. Also shown are a group of minislots whose time duration is very small compared to that of a message slot and occur at the beginning of each message slot. For message slots 100 and 101 this group of minislots, which can number from two up to perhaps a dozen, depending on the size of the system, are labeled by reference characters 104 and 106 and cover a total time period which is less than 1% of the time duration of a message slot and is more likely to be less than 0.5% of the time duration of the single message slot.

For the purposes of discussion of the specification, assume that the number of minislots at the beginning of each message slot in FIG. 1 is 8, so that in FIG. 2, which shows an expanded view of the minislot, K is equal to 8 and $\Delta t$ is the time duration of a single minislot. Thus $K \cdot \Delta t$ can be of the order of 0.5% of t, which is the time duration of the message slot. It will be noted that $t_m$ is a time period (as shown in FIG. 2) equal to the time period t of the message slot minus $K\Delta t$ or the total time period of the K minislots.

In both the Basic and the Extended ARRA formats there are two types of data packet transmission. There is an original transmission which is a transmission that occurs for the first time, and a retransmission which is a previously unsuccessful transmission that occurs for a second time or perhaps a third time, as will be seen later. Assume that in the system being discussed there are ten ground stations identified as stations A, B, C, D, E, F, G, H, I and J, each of which is capable of generating and receiving packets of data.

As discussed above, there are two types of formats that can be employed to cover two types of collisions between the data packets in a given message slot. The first case, which employs the channel format for basic ARRA, is the simplest format and processes those instances where two stations transmit at the same time in the same message slot.

Assume the simplest situation where no conflict can occur. Assume that station A wants to send a message to station B. Station A generates a packet of data and by random selection of message slot in the very next frame transmits it via message slot 94, in frame 98 to station B. Message slot 94 contains 8 minislots as defined above. When Station A generates this packet of information, one of the minislots in message slot 94 is picked at random and a pulse placed therein. Let's assume that this minislot is minislot 2 in FIG. 2. If Station A and Station B are the only two stations involved and no other stations are sending messages, there are no complications. The message is transmitted via the satellite, Station B receives it, and there is a portion of the data packet which contains an address which identifies Station B as the recipient of the message. Station B recognizes the message as being its own and receives and stores it. However, it should be noted that all stations in addition to Station B and A receive the information that a message has been transmitted in message slot 94 and that minislot 2 has been selected. The selection of message slot 94 means that if another station had in fact transmitted a message such as Station C during the same message slot 94, the information contained in the message slot would be garbled and unintelligible to both recipients.

It has been assumed that minislot 2 in message slot 94 had been picked to accompany the message transmitted from Station A. Now the selection of minislot 2 indicates that in case of a conflict, such as will now occur between Stations A and C in message slot 94, a retransmission must occur during the next available frame in which a retransmission can occur. Such retransmission by station A will be to that message slot identified by the pulse in minislot 2, which will correspond to message slot 2 in the next frame in which the retransmission can occur. Correspondingly, if Station C placed a pulse in minislot number 3, it would retransmit in message slot 3 of the future retransmission frame.

It should be noted that the next frame in which retransmission can occur is defined as follows. A message transmitted from Station A, for example, must radiate to the satellite and then be retransmitted back to the ground station, which requires a finite amount of time. The first complete frame that is received upon completion of this round trip of the message originating at Station A is examined by logic in each of the ground stations to determine which minislots have pulses therein. All the stations will know that Stations will retransmit in the announced message slots 2 and 3 respectively. It should be further noted that retransmission of the data packets from Station A and C occur in the immediately occurring frame after the first frame received after the round trip interval defined above, so that the retransmission of the data packets of Stations A and C will occur after a second round trip interval of the data packets to the satellite and back to the ground station. However, all other stations except Stations A and C will be able to transmit new packets of information, in all message slots in the retransmission frame excluding those indicated by minislots accompanied by collisions in the message slot. This is further explained in the following.

Let's assume Station A wants to send a message to Station B. It gets this packet of information and by random selection sends it in message slot 94. This message slot 94 contains a number of minislots which have been labeled 1, 2, 3 . . . K in FIG. 2. When Station A generates its data packet it's going to put a pulse at random in one of the minislots. Assume it picks minislot 2 and places a pulse in minislot 2. If Station A and Station B are the only two stations involved, and no other station is sending messages, there are no complications. The message is transmitted via the satellite, Station B receives it, and there is a part of the packet of information that contains an address to Station B which says, in effect, Station B this is your message. Station B recognizes the message as being its own and receives and processes such message. However, it's very possible that one of the other stations, for example Station C, transmits a message to Station D about the same time Station A transmitted its message. Station C formed its package and transmitted it during message slot 94. Now there are two messages in one message slot 94 and they are conflicting. One of them is addressed to go to Station B and the other is addressed to go to Station D. Assume that Station C arbitrarily picked at random minislot 3 as its retransmission choice in case of a conflict. The selection of minislot 3 has the following meaning. There are two stations, A and C, transmitting in the same message slot 94. Station A, by its selection of 2, had declared that it will retransmit its packet in the event of a conflict in the later message slot 2 during a subsequent frame, which frame is measured by the round trip propagation time of the entire system from one ground station to the common satellite and back to another ground station. Station C by its selection of minislot 3 has declared that if there is a conflict it will retransmit its message in message slot 3 on the next frame after the round trip propagation time of the whole system which would be the same frame as the retransmission of the message originally transmitted by Station A.

The information regarding the minislots 2 and 3 of Stations A and C is retransmitted via the satellite to all of the ground stations in the whole system so that all the ground stations know there is going to be a retransmission on the next available retransmission frame in minislots 2 and 3. Such other stations, however, do not know that these transmissions are going to be from Stations A and C and they further do not know the destinations of the retransmissions. The other stations simply know that these two message slots 2 and 3 in the next retransmission frame after the first round trip propagation time of the whole system are going to be occupied. Consequently, the remaining stations will consider the message slots 2 and 3 in this second frame, the retransmission frame, off limits to them for that frame. It is obvious that the system has now reduced the total number of possible conflicts and increased the efficiency of the system.

Assume now that the next frame does occur and that in message slot 2 there will be a retransmission from Station A, which will be addressed to Station B and received by Station B. The next message slot in the same frame will be message slot 3 and the recipient Station D which will receive and process such message. However, other complications can arise because somewhere in the system there could have been another station, such as Stations F and G, sending messages at the same time. That is to say that Station F transmitted a message and Station G also transmitted a message in the first frame 96 and selected by random selection minislots 2 and 4, respectively. More specifically, assume that Station F selected minislot 2, and Station G selected minislot 4. Stations F and A have now both selected minislot 2 in the next possible retransmission frame occurring after the round trip propagation time to the satellite and back to the ground station.

When retransmission of the data packets of transmitters A and F is attempted in this first retransmission frame after the first propagation time interval, it is apparent that the system is retransmitting two messages from A and F in the same message slot, namely, message slot 2 in the retransmission frame after the first propagation time interval. It is also apparent that the two messages originating from transmitters A and F, although they are retransmissions, represent essentially the same problem as the original conflicting transmission from transmitters A and B. Thus, when transmitters A and F attempt to transmit in message slot 2 in the second frame, each will pick a new minislot at random. Assume that this time transmitter A selects minislot 6 and F selects minislot 8. When they retransmit after the second propagation time interval of the system it is possible that there will be no conflict.

As discussed briefly above, there is a structure in FIGS. 6 and 7 to implement basic ARRA format shown in FIGS. 1 and 2. The structure of FIG. 7 and the structure of FIG. 8 is employed to implement the extended ARRA format shown in FIGS. 3, 4 and 5.

Before discussing the structure of FIGS. 6, 7 and 8, consider first the channel format for the extended ARRA shown in FIGS. 3, 4 and 5, which is an improvement over the basic ARRA of FIGS. 1 and 2. As background, it will be recalled that in FIGS. 1 and 2 it's possible to have two stations A and C as transmitters which select the same minislot randomly so that when the retransmission frame occurs the messages sent by transmitters A and C cannot be successfully transmitted to their destination because the conflict has already been established by selection of the same minislot 2. This is a problem that is solved by the structure of FIGS. 3, 4 and 5, which uses a common minislot pool (CMP). In the logic implementing the extended ARRA system shown in FIGS. 3-5, there is additional logic in each of the ground stations which will identify the situation described immediately above where Stations A and C selected minislots 2 and will instruct terminals A and C to abort their announced transmissions and will remove from the RAM in all ground stations the fact that message slot 2 defined by minislot 2 is unavailable, which then in fact makes minislot 2 in the retransmission frame available to any station except Stations A and C. The logic also must reschedule the transmission from A and C to some other message slot in the future frame beyond the first retransmission frame after the first round trip propagation transmission to the satellite. This is done by making a corresponding announcement by selecting any of the CMP minislots whenever a retransmission is aborted.

Logic is provided in the ground station that will select a new minislot for each of transmitters A and C. Assume that transmitter A picks minislot 1 (in the CMP) and transmitter C picks minislot 5 (in the CMP) after the second propagation trip to the satellite. In the next frame, after the next propagation time to the satellite, transmitters A and C will transmit their message in message slots 1 and 5 provided there is no conflict with other retransmitted messages. If there are conflicts with other retransmitted messages, the system must go through this process again.

It is important to note, however, that in extended ARRA when a conflict occurs, the system does not actually make a retransmission. If there is a conflict the system avoids the transmission and reschedules it until the next frame or the next frame after the next frame, etc., until all conflicts are resolved.

At this point the general discussion of FIGS. 1–5 has been substantially completed, and a discussion of the hardware to implement the format of FIGS. 1–5 will be discussed.

Consider first the block diagram of FIG. 6, which is generic to both the basic ARRA format shown in FIGS. 1 and 2 and the extended ARRA format shown in FIGS. 3, 4 and 5.

Referring now to FIG. 6, data in the form of data packets is supplied from data source 199 and delivered via leads 200 to an input data source buffer 202, which can be a rather large first-in, first-out (FIFO) data buffer. As indicated, the data is divided into packets so the FIFO itself, although standard, is fairly large and can be fairly complex. The data packets are extracted from FIFO 202, one by one via the cable 204 to a single packet transmit buffer 206, which stores the data packet until the proper timing pulse on lead 256 passes them via the multi-lead bus 208 into transmit scheduler 210. The transmit scheduler 210 is a complex piece of equipment, and serves both the basic ARRA format of FIGS. 1 and 2 and the extended ARRA format of FIGS. 3, 4 and 5 in a manner shown in FIGS. 7 and 8, respectively.

The transmit scheduler 210 performs three major functions as set forth below.

1. It assigns message slots for new transmissions. This requires that the transmit scheduler contain a table in the form of a random access memory (RAM) to maintain a record of message slots that have announced retransmissions in which it has already been announced via minislots that messages are to be transmitted. The RAM table must contain a listing of all the message slots which cannot be used in the next frame.

2. The transmit scheduler selects minislots which must accompany each message transmission. Thus, in case a retransmission is required, it is necessary to choose new minislots which are selected by a random number generator. The transmit scheduler must therefore contain a random number generator to select new minislots.

3. A third primary function of transmit scheduler 210 is to delay and retransmit colliding messages as announced by the station in question. The foregoing requires selectable delays to place the data packet in the announced message slot location. This means that the data packet which is going to be retransmitted must go in the message slot selected by the randomly selected minislot in the next frame, and identifies the specific message slot in which the packet will be stored and retransmitted.

The output of transmit scheduler 210 is a data packet supplied via bus 212 which can be either a serial or parallel transmission means to the full duplex modem 214, then via bus 216 to the up converter 218. The output of modem 214 is supplied serially, bit by bit, to the up converter system 218, then to an RF amplifier 220 to antenna 222, then to the satellite, not shown in FIG. 6.

The transponder in the satellite reflects the received data back where it is picked up by an antenna corresponding to antenna 222 of each of the ground stations, then through amplifiers corresponding to amplifier 220 of FIG. 6, to the RF subsystem which is now a down converter, then in parallel to bus 216 into full duplex modem 214. The received data is then supplied in parallel form via bus 226 to the cyclic redundancy check (CRC) decoder 228, which determines if there is an error. If an error exists it will almost always be due to more than one message being received at a given time. How such an error is detected is a separate subject and is explained in detail in the following publications.

"Technical Aspects of Data Communications", J. E. McNamara, Digital Press, Bedford, MA, 1982 (Chapter 13, pp. 110–122).

"Errors and Error Control", H. O. Burton and D. D. Sullivan, Proceedings of IEEE, Vol. 60, pp. 1293–1301, Nov. 1972.

The conclusion of CRC 228 as to whether an error exists is a go or no go decision. If the decision is that no error is present and the message is correct, such message is supplied to the address recognition circuit 232 via lead 230, then via bus 234 in parallel to a data receiver 235 where it is utilized.

The foregoing is an example of a perfect transmission where no problems exist, that is, no conflicts or collisions have occurred.

Assume now that a conflict or collision does occur. More specifically assume that two channels or two transmitters A and B both transmit at the same time on the same message slot. It is to be understood that the conflict occurs upon the reception of the data packet from two different transmitters since the transmit scheduler 210 is unique only to the data packet generated in the single transmitter shown in FIG. 6. Thus the output of transmit scheduler 210 initially is supplied to full duplex modem, which is also unique to only one transmitter at this point. The output of modem 214 goes to converter 218 and antenna 222 as a clean signal. If transmitter C had transmitted at that same time, the satellite would be retransmitting back at the same time, and transmitter A of FIG. 6 would receive two messages, one originating from transmitter A and the other from transmitter C. Both data packets are being received by antenna 222 at the same time and being supplied to down converter 218 and into full duplex modem 214 simultaneously. One of these signals will be a signal via dotted lead 224 from full duplex modem 214 to transmit scheduler 210 and labeled "received minislot announcement" which is a valid announcement to be acted upon only if the message error indicator 252 is positive (error condition). The system always receives that signal back because it always has at least one minislot filled indicating the proper message transmitted. However, the system will also receive an output from CRC 228 indicating an error via lead 252, which is supplied via lead 258 back to transmit scheduler 210, which indicates there is an error and that error is probably the fact that two transmitters were transmitting at the same time. The transmit scheduler 210 will then examine the output of lead 252 and conclude that an error exists and that certain results must occur. These results are those shown essentially to the right of transmitter scheduler 210 in FIG. 6 and set forth above in the specification.

If the system had a collision of two messages in message slot 2 as received by antenna 222, then the random selector in the transmit scheduler 210 of FIG. 6 must schedule retransmission as announced. If minislot 2 has been selected, then the data package will be retransmitted in message slot 2 in the next frame.

If there is no conflict or collision, a signal appears on lead 256 from transmit scheduler 210 to buffer 206, which indicates that the transmission was all right, without collision with another transmission, and a signal is sent via lead 260 to FIFO 202 indicating that another data packet can be accepted by single packet transmit buffer 206 for another transmission.

Consider now the block diagram of FIG. 7 which is basically an expansion of the transmit scheduler 210 of FIG. 6. A received minislot announcement is supplied via lead 224 from modem 214 of FIG. 6 to table 300 of FIG. 7 and a message error indicator is supplied via lead 252 from the CRC logic 228 of FIG. 6 to block 300 (via lead 252) of FIG. 7. As discussed in connection with FIG. 6, if a one appears in both input leads 224 and 252 into logic 300, it indicates a collision, that is an error, and requires retransmission of the colliding data packets. A minislot defined by the pulse supplied via lead 224 is dumped into the table 300 and ultimately, as will be explained later, the same transmission packet is accessed in the single packet transmit buffer 206 and retransmitted.

It should be noted that the logic 300 contains the unavailable message slots in the next frame. At the end of the current frame, before the occurrence of the next available frame, the identification of the unavailable message slots are dumped into a RAM table contained in block 302. The framing sync signals, the message sync signals, and the minislot sync signals appear on leads 242, 244 and 246 in FIG. 6 and are all generated by timing sync module 240 which is common to all of the transmitters. The timing sync module 240 in turn derives its timing signal from the output of the full duplex modem 214 of FIG. 6 in a well known manner. When each new packet of information arrives in a single packet transmit buffer 206 of FIG. 7 from FIFO 202 of FIG. 6 the transmission of that new packet is initiated. While the process is in fact started when the new packet arrives in the single packet transmit buffer 206 of FIG. 7, it does not actively enter into the process of selecting a message slot until the start of the next frame. Such delay exists until the beginning of the next frame when one of the available message slots is selected by using the information of table 302. As block 302 contains the table of unavailable slots, the logic in block 310 must in fact select one of the remaining message slots to obtain an available and usable message slot. A random selection is effected by means of a random number generating logic contained in the logic of block 310. Assume that the message slot randomly selected is message slot 7. Appropriate timing and delay means is provided within block 312 to delay the placing of the data package into the frame until message slot 7 occurs, at which time the data package is inserted into message slot 7 in block 312.

It is now necessary to randomly select one of K minislots for retransmission announcement purposes, as discussed above, in the event of a collision. Such random selection of a minislot is done within block 314 which must contain random number generator logic and be accompanied by a record keeping means, such as a RAM, (in block 320), to record which particular minislot has been selected to correspond to the selected message slot 7. Assume, for purposes of discussion, that minislot 3 has been selected. Value 3 is placed in the RAM in block 320, and a pulse is placed in word location 3 of the RAM data buffer in block 316 to indicate selection of minislot 3.

In block 320 the randomly selected minislot is stored for later reference. Also, the selected minislot is appended to the data packet in logic block 316 to assume the format shown in FIGS. 1 and 2 to form the complete packet which is then supplied via lead 212 to the modem 214 and then the up converter RF, amplifier 220 and antenna 222 for transmission.

Upon retransmission from the satellite, the transmitter of FIG. 6, now functioning as a receiver, receives the signal that's transmitted and supplies it to amplifier 220, down converter 218, full duplex modem 214, CRC logic 228 of FIG. 6, and if the message is correct, through logic 232 to a data receiver 235. The logic blocks 320, 322 and 324 correspond generally to the logic 228, 232 and 235 of FIG. 6. More specifically, if decision block 324 of FIG. 7 after observing the signal on lead 252 finds no error then it energizes the clear buffer signal logic 326 to clear the single packet transmit buffer logic 206 which then applies a new data packet into the system via delay means 308. If there is an error, that is a collision resulting from the simultaneous transmission of two data packets, then the output of decision block 324 so indicates by sending a signal to logic 330 which is labeled "take packet from input buffer." The input buffer so indicated is the FIFO 202 shown in FIG. 6 and in fact means the retransmission of the same data packet whose transmission has failed.

In FIG. 7, if two new transmissions decided to use message slot 4 and one transmission arbitrarily selected minislot 1 and the other selected minislot 2, there would of course be a conflict in message slot 4. But in the retransmission frame, one of the packets would be transmitted in message slot 1 and the other in message slot 2, and the conflict would be avoided assuming that no other message packets from other transmitters were involved. Other new transmissions could pick minislots 3, 4, 5, 6, 7, 8 in said retransmission frame.

Alternatively, the system in FIG. 7 could have three messages all picking message slot 4 with one of the message slots picking minislot 4 and the other two message slots picking minislots 2 and 3 so the only minislots left are 4, 5, 6, 7, 8. Any new transmissions would have to pick one of these remaining minislots.

It should be noted that if there is a retransmission occurring at any station that station cannot accept a new transmission at that time. The station, such as the station shown in FIG. 7, must wait until all retransmissions are resolved. Then the station of FIG. 7 can generate a new transmission. However, it is possible to have the new transmission from the transmitter of FIG. 7 even though another transmitter, such as transmitter B, is currently working with an old transmission or retransmission.

Returning again to a discussion of the station of FIG. 7 receiving a signal back from the satellite which contains two or more simultaneous data packets and therefore an erroneous signal. Such erroneous signal is detected in block 324, indicated to block 330, which takes the same data packet from the input buffer 260 of FIG. 6, as discussed before, for retransmission in the next available frame. The logic of block 330 also supplies a signal to block 332 labeled as a delay to the message slot M (the value of which was stored in block 320) of the next frame. This message slot is then supplied via lead 336 to block 314 in which another minislot is selected randomly and handled by the logic of block 316 in the manner described above. In block 318 the data packet is transferred to the modem 214 for subsequent retransmission via antenna 222 in the manner described hereinbefore. Upon reception of the message back from the satellite it flows through modem 214, CRC logic 228 and logic 232, if there is no error. If there is an error then the signal is processed down to transmit scheduler block 210 as described above, and the whole process is repeated again.

Turning now to the logic of FIG. 8, there will be set forth a fuller and more detailed description of the operation of this Extended ARRA mode of operation, the concept of which is generally as follows, and is, in effect, a system which processes second order conflicts or collisions, thereby improving the efficiency further.

A general description of extended ARRA follows.

An examination of the basic ARRA protocol described above reveals that due to the fact that announced retransmissions take place unconditionally, a number of guaranteed collision situations among retransmitted messages occur. To improve the capacity, the retransmission strategy of Basic ARRA can be slightly modified to avoid such predictable collisions. In particular, it is clear in basic ARRA that if two or more unsuccessful messages in a frame select the same retransmission slot in the next frame, a collision will certainly occur. Consider first an idealized scenario in which ternary feedback (empty, success i.e. one transmission, collision i.e. two or more transmissions is also available from the announcement minislots. Note that this may imply the transmission of more than one bit per minislot to be practicable. Also consider an extension to the channel format of Basic ARRA, as shown in FIG. 2, in which each frame begins with a group of K minislots which is not associated with any of the K message slots. This group of minislots is referred to as the common minislot pool (CMP). In a system with T second message packets, the proportional overhead introduced by this format is of the order of $(K+1)^{\Delta}T/T$ (see FIGS. 3A and 5).

As with Basic ARRA protocol, users monitor the active minislots associated with a message collision (C). In addition, all transmissions in the common minislot pool are also noted, as if they were accompanied by a status=C message slot. Now instead of merely noting down the active minislot indices, a pair of values ($m_i$=index, $v_i$=status and can represent either a successful transmission (S), a collision (C), or an empty mini-slot (E) is saved for each such minislot. The value of $v_i$ for ternary feedback (the 3 conditions S, C or E) may be either S or C for an active minislot. In Extended ARRA, the goal is to identify conflicts among announced retransmissions and abort these, thereby freeing up a larger portion of the frame for use by new transmissions. Aborted retransmissions obviously require a mechanism for announcing the intended slot for the next retransmission attempt; hence the use of the common minislot pool. Whenever a retransmission is aborted, the corresponding retransmission announcement is made in the common minislot pool.

To identify conflicts, first all entries of the type ($m_i$, C) are identified and the corresponding retransmissions are aborted. This prevents two colliding messages from retransmitting in the same slot in their next trial. Next, all retransmissions corresponding to entries which occur more than once are identified and aborted. This step prevents unsuccessful messages in different slots of the present frame from selecting the same retransmission slot in the next frame. Finally only those ($m_i$, S) entries which occur exactly once are identified as nonconflicting and retransmissions corresponding to these are allowed to take place. Correspondingly, the disallowed set D for new transmissions is formed by taking the union of these unique entry indices. Observe that these steps guarantee that there will be no colliding retransmissions i.e. those which have not been aborted will be successful. To summarize:

Extended ARRA

1. All transmissions are accompanied by a retransmission slot (randomly selected from 1 to K) announcement in the minislotted subchannel.

2. In frame J, new transmissions originating in frame (J−1) are transmitted in a randomly selected message slot from the allowed set A=F−D.

3. The set D for frame J is computed by monitoring transmissions received during frame (J−1) in the following manner:

(i) Active minislots with a collision in their corresponding message slot and those in the common minislot pool are noted, and a pair ($m_i$=index, $v_i$=status) is saved.

(ii) Retransmissions associated with entries having status=C are aborted. Then retransmissions associated with repeated (two or more successful announcements of the same index) entries with status=S are aborted.

(iii) All aborted retransmissions are replaced by an announcement for the next retransmission attempt in the common minislot pool of the next frame.

(iv) The disallowed set D is computed as the union of the unique slot indices corresponding to entries which remain after step (ii).

4. Only the retransmissions associated with unique ($m_i$, S) entries (identified in 3-(iv) (above) are actually placed on the announced message slots of the next (Jth) frame.

Supposing transmitters A and B both want to transmit a message on message slot 4. A selects a minislot 1, and B selects minislot 2. There is no conflict at this point. However, if there is another pair of transmitters in say message slot 7 of the current frame, for example transmitter C, involved which selects minislot 2 and a fourth transmitter D which selects minislot 5, then there are two transmitters B and C selecting message slot 2 in the retransmission frame which will create a conflict. This is the conflict that the structure of FIG. 8 will avoid.

The system requires a common minislot pool shown in FIGS. 3, 4 and 5. The specific problem is that channels B and C have both selected message slot 2 in the retransmission frame. All of the other transmitters know this by observing minislots, have stored it in their RAM memories, that is the tables which are formed in their RAM memories. The system logic is arranged so that neither transmitter B nor transmitter C can actually use the conflicted message slot 2 in the retransmission frame. However, because transmissions from B and C are aborted, any other transmitter can use message slot 2 in this same frame for new messages. For example, transmitter H can use message slot 2. Transmitter H will know from the additional logic incorporated here that message slot 2 is available during the current frame. This is in contrast to Basic ARRA in which message slot 2 is not available to transmitter H and a wasteful collision between B and C occurs in slot 2. B and C must have logic that will indicate to transmitters B and C when to abort announced retransmissions for which conflicts can be predicted. All three of the transmitters, B, C and H are looking at their own memories and are going to interpret them differently.

Thus, whenever it appears that two retransmissions are going to occur in message slot 2 in the next frame, it is identified as a predictable conflict. So the question arises as to why let such a conflict occur at all. As described above, The conflict is avoided by simply barring both transmitters B and C from transmitting in message slot 2 in the next frame. Because it is not used by B and C, message slot 2 in the next frame can accept messages from transmitters other than B and C. Also, since retransmission from B and C have been aborted, a way of rescheduling their retransmissions is needed. This is done simply by placing a pulse at random in one of the K common pool minislots (CMP), indicating the selected message slot in the next retransmission frame. The system works by adding some logic to the interpretation of the table of unavailable slots recorded by each terminal. Any terminal that has in its RAM memory the number 2 (representing a minislot) occurring two or more times indicates that any transmitter can take the message slot represented by minislot 2, except stations which announced retransmissions for the conflicting slots in question.

The question arises as to how the other transmitters know that the appearance of the numeral 2 twice in the minislot represent transmitters A and C. This information is contained in the repeated minislot entry table in block 446 of FIG. 8. Examination of this table prevents transmitters A and B from using message slot 2 in the next occurring frame.

Consider now the upper right hand portion of FIG. 8. A minislot announcement via lead 448 is received from modem 214 of FIG. 6 which is supplied into a word location in RAM 444 which is a table of unavailable slots in the next frame, that is, slots unavailable to new transmission. Logic block 444 not only notes the presence of a 1 in a minislot and a message error, but also notes the common minislot pool announcement on input lead 448.

The contents of table 444 are transferred once every frame to block 400, repeated minislot entries are eliminated from the table of unavailable slots (which is a function of the Extended ARRA logic of FIG. 8 and is not obtainable with the logic of FIG. 7).

The elimination of repeated minislot entries from the table of unavailable slots in block 400 and the transfer of the remaining slots into block 402 leaves in block 402 a table of available slots to new transmissions in the current frame. Simultaneously, the list of eliminated minislot entries is stored in block 446. A delay is built in block 452 until the start of the next frame, at which time a new data packet is supplied from the single packet transmit buffer 454 into the system to block 452 and then at the proper time into block 404. The delay 454 is of sufficient duration to insure that the selected message slot which we'll assume to be J noted in block 404 is in a time position to receive the new data packet stored in the delay means 452.

In block 406 the data packet goes to block 408 where one of the K minislots is randomly selected and then appended to the data packet in block 410. The appending of the minislots of the data packet means that the minislot is positioned in a small dedicated section of the RAM in block 410 of FIG. 8. Subsequently, in block 412, the data message is transferred to the modem 214 of FIG. 6 for transmission via antenna 222 to the satellite and then to the other stations. The announced minislot number 404 in passing through blocks 406, 408, 410 and 412 is supplied to storage logic 414 where the announced minislot number is stored. When the transmitted data packets arrive back from the satellite the transmitter of FIG. 8 compares it with the transmitted message received to determine whether an error occurred.

The decision as to whether conflict occurred is made in decision block 418 by examining lead 450. If there is no error then the signal is sent to buffer signal logic 420 which asks the single packet transmit buffer 454 for a new data packet for the next transmission and the process starts anew. If there is an error detected in block 18, then the retransmission cycle is started. First, the block 424 verifies whether the announced retransmission was free of conflict. This is done by comparing the announced retransmission minislot (stored in 414) with the list of repeated entries in block 446. If no conflict exists, the retransmission is allowed to proceed as announced via blocks 442, 426, 408, 410 and 412, as in previously described cases. If there is a second order conflict (detected in block 424), then the announced retransmission is aborted by setting null data in block 480 and then transmitting only a minislot announcement in the CMP via blocks 438, 408, 410 and 412.

Reference is made to co-pending application S. N. by Dipankar Raychaudhuri, filed June 11, 1982 and entitled "Time Division Multiple Access Communications Systems," and incorporated herein reference for additional description of some of the principles of time slots and their use by data packets.

What is claimed is:

1. A contention system for transmitting information among a plurality of transmitter-receivers along a transmission path having a delay which is long compared with the duration of an information message, so that the transmitter-receivers cannot directly establish the current status of the transmission path, the system comprising:

means for establishing a uniform time frame among said transmitter-receivers, said time frame including recurrent frame intervals, each frame interval including a predetermined plurality of sequential information message intervals, each information message interval including a minislot interval preceding an information transmission interval, each minislot interval including a plurality of sequential minislots equal to said predetermined plurality;

random initial transmission time selection means associated with each of said transmitter-receivers for accepting during a current frame interval information to be transmitted and for randomly selecting as a selected information message interval during which transmission will occur one of said information message intervals from among available ones of said predetermined plurality of information message intervals in the selected frame interval next following said current frame interval;

random retransmission time selection means associated with each of said transmitter-receivers for randomly selecting as a retransmission information message interval one of said information message intervals from among said predetermined plurality of information message intervals in a retransmission frame interval following said selected frame interval by at least said delay;

announcing and transmission means associated with each of said transmitter-receivers for transmitting an announcement message during the minislot interval of said selected information message interval, and within said minislot interval of said selected information message interval, within that minislot corresponding in minislot sequence within said minislot interval to the sequential position of said one of said retransmission information message intervals within said retransmission frame interval, thereby announcing to all receivers that particular information transmission interval during which retransmission of said information to be transmitted will occur in the event that a collision occurs in said selected information message interval within said selected frame interval;

collision identifying means associated with each of said transmitter-receivers for identifying collisions within said information message intervals;

identifying and inhibiting means associated with each said transmitter-receivers for identifying said available ones of said predetermined plurality of information message intervals in said selected frame interval, said identifying and inhibiting means excluding as available information message intervals those information message intervals which are both announced by any of said announcing and transmission means as being for retransmission of information in the event of a collision, and identified by said collision identifying means as being associated with a collision.

2. A contention access communications system for transmitting information among a plurality of transmitter-receivers by way of a transmission path having a time delay between any transmitter and any receiver which is long by comparison with the duration of an information message, the system comprising:

timing means for establishing a uniform time frame among said transmitter-receivers, said time frame including recurrent frame intervals, each frame interval including a common minislot interval and an information interval including a predetermined plurality of message slots, said common minislot interval including a plurality equal to said predetermined plurality of time-sequential common minislots, said message slots each including an information message interval and an individual minislot interval including a plurality equal to said predetermined plurality of individual minislots;

random initial transmission time selection means associated with each of said transmitter-receivers for accepting during a current frame interval information to be transmitted and for selecting as an initial transmission message slot one of a plurality of available ones of said predetermined plurality of message slots in an initial transmission frame interval following said current frame interval;

random retransmission time selection means associated with each of said transmitter-receivers for randomly selecting as a first retransmission message slot one of said message slots in a first retransmission frame following said initial transmission frame by at least said delay;

announcing and transmission means associated with each of said transmitter-receivers and responsive to said timing means, to said random initial transmission time selection means, and to said random retransmission time selection means for transmitting said information during said initial transmission message slot, and for, during said individual minislot interval of said initial transmission message slot, transmitting a first retransmission announcement in that individual minislot corresponding in individual minislot sequence within said individual minislot interval to the sequence position of said first retransmission message slot within the sequence of said message slots of said first retransmission frame, thereby announcing to all said transmitter-receivers that particular message slot in which retransmission of said information is scheduled to take place in the event of a collision occurring in said initial transmission message slot;

collision identification means associated with each of said transmitter-receivers and responsive to said announcing and transmission means for identifying a collision within said information message interval of said initial transmission message slot;

counting means associated with each of said transmitter-receivers and responsive to said collision means and to said announcing and transmission means for establishing the number of collisions which occur in each frame for which each retransmission message slot is selected, and for identifying said first retransmission message slot as one of having been selected once in said first retransmission frame and therefore being a valid first transmission slot and having been selected more than once in said first retransmission frame and therefore being an invalid first retransmission slot;

first inhibiting means coupled to said counting means and to said random initial transmission time selection means for excluding from said plurality of available message slots those message slots of a frame interval designated as valid;

second random retransmission time selection means associated with each of said transmitter-receivers and coupled to said counting means, for, in response to designation of said first retransmission message slot as invalid, randomly selecting a further retransmission message slot from among message slots of a further retransmission frame following said first retransmission frame by at least said delay; and first retransmission means coupled to said random retransmission time selection means, to said collision identification means and to said counting means for retransmitting said information during said first retransmission message slot if said counting means designates it as valid, and, when said counting means designates said first retransmission message slot as invalid, for inhibiting retransmission of said information during said first retransmission frame, and for, during said common minislot interval of said first retransmission frame, transmitting a further retransmission announcement in that common minislot corresponding in common minislot sequence to the sequence position of said further retransmission message slot within the sequence of said message slots of said further retransmission frame, thereby announcing to all said transmitter-receivers that particular message slot in which further retransmission of said information is scheduled to take place.

3. A system according to claim 2 wherein said collision identification means further identifies collisions occurring within said individual minislot interval of said initial transmission message slot and within said common minislot interval of said initial transmission frame interval.

4. A system according to claim 3 wherein more than one bit per minislot is transmitted.

5. A contention transmitter-receiver for a contention system for transmitting information along a transmission path having a delay which is long compared with the duration of an information message, so that the transmitter-receiver cannot directly establish the current status of the transmission path, the system including means for establishing a uniform time frame along all associated transmitter-receivers, said time frame including recurrent frame intervals, each frame interval including a predetermined plurality of sequential information message intervals, each information message interval including a minislot interval preceding an information transmission interval, each minislot interval including a plurality of sequential minislots equal to said predetermined plurality;

said transmitter-receiver comprising:

random initial transmission time selection means for responding during a current frame interval to acceptance of information to be transmitted to other transmitter-receivers of the system and for randomly selecting as an initial transmission information message interval one of said information message intervals from among available ones of said predetermined plurality of information message intervals in the initial transmission frame interval next following said current frame interval;

random retransmission time selection means for randomly selecting as a retransmission information message interval one of said information message intervals from among said predetermined plurality of information message intervals in a retransmission frame interval following said initial transmission frame interval by at least said delay;

announcing and transmission means coupled to said random initial transmission time selection means and to said random retransmission time selection means for transmitting an announcement message during the minislot interval of said initial transmission information message interval, and within said minislot interval of said initial transmission information message interval, within that minislot corresponding in minislot sequence within said minislot interval to the sequential position of said one of said information message intervals within said retransmission frame interval, thereby announcing to all said associated transmitter-receivers that particular information transmission interval during which retransmission of said information to be transmitted will occur in the event that a collision occurs in said initial transmission information message interval within said initial transmission frame interval;

collision identifying means for identifying collisions within said information message intervals; and identification and inhibiting means coupled to said collision identifying means and to said random initial transmission time selection means for identifying said available ones of said predetermined plurality of information message interval in said retransmission frame interval, said inhibiting means excluding as available information message intervals those information message intervals received from said system which are both announced as being for retransmission of information in the event of a collision, and identified by said collision identifying means as being associated with a collision.

6. A contention transmitter-receiver for a contention system for transmitting information among a plurality of similar transmitter-receivers by way of a transmission path having a time delay between any transmitter and any receiver which is long by comparision with the duration of an information message, the system including:

timing means for establishing a uniform time frame among said transmitter-receivers, said time frame including recurrent frame intervals, each frame interval including a common minislot interval and an information interval including a predetermined plurality of message slots, said common minislot interval including a plurality equal to said predetermined plurality of time-sequential common minislots, said message slots each including an information message interval and an individual minislot interval including a plurality equal to said predetermined plurality of individual minislots, said transmitter-receiver comprising:

random initial transmission time selection means for accepting during a current frame interval information to be transmitted and for selecting as an initial transmission message slot one of a plurality of available ones of said predetermined plurality of message slots in an initial transmission frame interval following said current frame interval;

random retransmission time selection means for randomly selecting as a first retransmission message slot one of said message slots in a first retransmission frame following said initial transmission frame by at least said delay;

announcing and transmission means responsive to said random initial transmission time selection means and to said random retransmission time selection means for transmitting said information during said initial transmission message slot, and for, during said individual minislot interval of said initial transmission message slot, transmitting a first retransmission announcement in that individual minislot corresponding in individual minislot sequence with said individual minislot interval to the sequence position of said first retransmission message slot within the sequence of said message slots of said first retransmission frame, thereby announcing to all said transmitter-receivers that particular message slot in which retransmission of said information is scheduled to take place in the event of a collision occurring in said initial transmission message slot;

collision identification means for identifying a collision within said information message interval, within said individual minislot interval of said initial transmission message slot and within said common minislot interval of said initial transmission frame interval;

counting means coupled to said collision identification means for establishing the number of collisions which occur in each frame for which each retransmission message slot is selected, and for identifying said first retransmission message slot as one of (a) having been selected once in said first retransmission frame and therefore being a valid first retransmission slot and (b) having been selected more than once in said first retransmission frame and therefore being invalid;

first inhibiting means coupled to said counting means and to said random initial transmission time selection means for excluding from said plurality of available message slots those message slots of a frame interval designated as valid;

random second retransmission time selection means coupled to said counting means, for, in response to designation of said first retransmission message slot as invalid, randomly selecting a further retransmission message slot from among message slots of a further retransmission frame following said first retransmission frame by at least said delay; and first retransmission means coupled to said random retransmission time selection means, to said random second retransmission time selection means, and to said counting means for retransmitting said information during said first retransmission message slot if said counting means designates it as valid, and, when said counting means designates said first retransmission message slot as invalid, for inhibiting retransmission of said information during said first retransmission frame, and for, during said common minislot interval of said first retransmission frame, transmitting a further retransmission announcement in that common minislot corresponding in common minislot sequence to the sequence position of said further retransmission message slot within the sequence of said message slots of said further retransmission frame, thereby announcing to all said transmitter-recievers that Particular message slot in which further retransmission of said information is scheduled to take place.

7. A method for communicating information among a plurality of transmitter-recievers by way of a transmission path having a path time delay which is long by comparison with the duration of a packet of information, comprising the steps of:

establishing a uniform time frame among said transmitter-receivers, including recurrent frame intervals;

establishing within each of said frame intervals a predetermined plurality of time-sequential message slots;

esabilishing within each of said message slots a time sequence of an information interval and a second plurality of time sequential minislots, said second plurality being equal to said first plurality;

at a first transmitter-receiver of said plurality of transmitter-receivers, accepting during a current frame interval first information to be transmitted to all of said transmitter-receivers;

at said first transmitter-receiver, organizing said first information into a first original packet to be transmitted over said transmission path;

at said first transmitter-receiver, randomly selecting a first original transmission message slot from among said first plurality of message slots in a transmission frame interval next following said current frame interval, said first original transmission message slot being selected for original transmission of a first original information packet including said first information;

at said first transmitter-receiver, randomly selecting a first retransmission message slot from among said plurality of message slots in a retransmission frame interval following said transmission frame interval by a period at least equal to said path time delay;

transmitting into said transmission path at said first transmitter-receiver said first original packet during said information interval of said first original transmission message slot and a first retransmission signal during that minislot corresponding in minislot sequence position to the sequential position of said first retransmission message slot within said plurality of message slots in said retransmission frame;

at a second transmitter-receiver of said plurality of transmitter-receivers, accepting during said current frame interval second information to be transmitted to all of said transmitter-receivers;

at said second transmitter-receiver, organizing said second information into a second orginal packet to be transmitted over said transmission path;

at said second transmitter-receiver, randomly selecting a second original transmission message slot from among said first plurality of message slots in said transmission frame interval, said second original transmission message slot being selected for original transmission of a second original information packet including said second information;

at said second transmitter-receiver, randomly selecting a second retransmission message slot from among said plurality of message slots in said retransmission frame interval;

transmitting into said transmission path at said second transmitter-receiver said second original packet during said information interval of said second original transmission message slot and a second retransmission signal during that minislot corresponding in minislot sequence position to the sequential position of said second retransmission message slot within said plurality of message slots in said retransmission frame, whereby if said first and second original transmission message slots happen to be identical a collision occurs and said first and second information is scrambled as received, but said first and second retransmission signals are identifiable;

at all said transmitter-receivers, generating a collision signal in response to an inability to recover information during said collision;

at all said transmitter-receivers except said first and second transmitter-receivers, inhibiting transmission during said first and second retransmission message slots of said retransmission frame interval in response to said collision signal;

at said first transmitter-receiver, in response to said collision signal, retransmitting said first information as a first retransmission packet during said first retransmission message slot in said retransmission frame;

at said second transmitter-receiver, in response to said collision signal, retransmitting said second information as a second retransmission packet during said second retransmission message also in said retransmission frame.

* * * * *